US007908463B2

(12) United States Patent
Lie

(10) Patent No.: US 7,908,463 B2
(45) Date of Patent: Mar. 15, 2011

(54) IMMEDIATE AND DISPLACEMENT EXTRACTION AND DECODE MECHANISM

(75) Inventor: Sean Lie, Santa Clara, CA (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 440 days.

(21) Appl. No.: 11/768,417

(22) Filed: Jun. 26, 2007

(65) Prior Publication Data

US 2009/0006814 A1    Jan. 1, 2009

(51) Int. Cl.
*G06F 9/30* (2006.01)
(52) U.S. Cl. .................. 712/210; 712/208; 712/300
(58) Field of Classification Search .............. 712/208, 712/210
See application file for complete search history.

(56) References Cited

U.S. PATENT DOCUMENTS

| | | | | |
|---|---|---|---|---|
| 5,353,420 | A | | 10/1994 | Zaidi |
| 5,581,717 | A | * | 12/1996 | Boggs et al. .................. 712/208 |
| 5,822,555 | A | | 10/1998 | Brown et al. .................. 712/204 |
| 5,822,558 | A | | 10/1998 | Tran |
| 5,832,258 | A | * | 11/1998 | Kiuchi et al. .................. 712/226 |
| 6,047,371 | A | * | 4/2000 | Miyake et al. .................. 712/220 |
| 6,175,908 | B1 | | 1/2001 | Pickett |
| 6,209,079 | B1 | * | 3/2001 | Otani et al. .................. 712/210 |
| 6,237,074 | B1 | * | 5/2001 | Phillips et al. .................. 711/213 |
| 6,237,087 | B1 | * | 5/2001 | O'Connor .................. 712/226 |
| 6,308,258 | B1 | * | 10/2001 | Kubota et al. .................. 712/210 |
| 6,732,257 | B1 | * | 5/2004 | Sheaffer .................. 712/210 |
| 2002/0108027 | A1 | * | 8/2002 | Miyamori .................. 712/223 |
| 2002/0126663 | A1 | * | 9/2002 | Katzman et al. .................. 370/389 |
| 2007/0008197 | A1 | | 1/2007 | Ohashi et al. |
| 2007/0109160 | A1 | | 5/2007 | Pisarevsky et al. |
| 2007/0183506 | A1 | | 8/2007 | Chujoh et al. |

FOREIGN PATENT DOCUMENTS

| | | |
|---|---|---|
| EP | 0506972 | 10/1992 |
| WO | 96/37829 | 11/1996 |

OTHER PUBLICATIONS

Written Opinion and International Search Report dated Oct. 27, 2008 for International Application No. PCT/US2008/007960 filed Jun. 26, 2008.
U.S. Appl. No. 11/775,466, filed Jul. 10, 2007.
U.S. Appl. No. 11/775,451, filed Jul. 10, 2007.

* cited by examiner

*Primary Examiner* — Eddie P Chan
*Assistant Examiner* — Idriss N Alrobaye
(74) *Attorney, Agent, or Firm* — Meyertons, Hood, Kivlin, Kowert & Goetzel, P.C.; Erik A. Heter

(57) ABSTRACT

An extraction and decode mechanism for acquiring and processing instructions and the corresponding constant(s) embedded within the instructions. The extraction and decode mechanism may be included within a processing unit, and may comprise an instruction decode unit and at least one constant steer network. During operation, the instruction decode unit may obtain and decode instructions which are to be executed by the processing unit. For each instruction, the instruction decode unit may also determine the location of one or more constants embedded within the instruction. The constant steer network may receive the location information from the instruction decode unit. While the instruction decode unit decodes the instruction, the constant steer network may obtain the constant(s) embedded within the instruction based on the location information and store the constant(s). The constant(s) embedded within the instruction may be immediate or displacement (imm/disp) constant(s).

19 Claims, 6 Drawing Sheets

IMMEDIATE AND DISPLACEMENT EXTRACTION AND DECODE MECHANISM

BACKGROUND OF THE INVENTION

1. Field of the Invention

This invention relates to microprocessor architecture and, more particularly, to an immediate and displacement decode mechanism.

2. Description of the Related Art

In various systems, the front end of a processor core typically includes an instruction decode unit for decoding instructions that are fetched from the instruction cache before being sent to the execution unit. Besides the actual instruction bits, fetched instructions usually have one or more constants that are used, for example, by the execution unit to process the instructions. For instance, in some systems, fetched instructions may include immediate or displacement (imm/disp) constants.

In typical processors, to perform the decode operation, the instruction decode unit may retrieve the actual instructions from a first buffer and ignore the constants. After the instructions are decoded, the decoded instructions are stored in a second buffer. When a decoded instruction is ready to be sent to the execution unit, a steer unit usually retrieves the constants from the first buffer and provides the constants to the execution unit at approximately the same time the instruction decode unit provides the corresponding decoded instruction to the execution unit.

In these systems, the first buffer typically needs to be relatively large in size, since it has to reserve space for the constants until the corresponding instruction is decoded and ready to be sent to the execution unit. In other words, in some cases, the constants may need to be stored in the first buffer for several clock cycles. The relatively large size of the first buffer may increase die area and cost of the processor.

SUMMARY

Various embodiments are disclosed of an extraction and decode mechanism for acquiring and processing instructions and the corresponding constant(s) embedded within the instructions. The extraction and decode mechanism may be included within a processing unit, and may comprise an instruction decode unit and at least one constant steer network. During operation, the instruction decode unit may obtain and decode instructions which are to be executed by the processing unit. For each instruction, the instruction decode unit may also determine the location of one or more constants embedded within the instruction. The constant steer network may receive the location information from the instruction decode unit. While the instruction decode unit decodes the instruction, the constant steer network may obtain the constant(s) embedded within the instruction based on the location information and store the constant(s). In various embodiments, the constant(s) embedded within the instruction may be immediate or displacement (imm/disp) constant(s).

In some embodiments, the processing unit may include an instruction buffer to store the instructions which are to be decoded by the instruction decode unit. Each instruction may include one or more instruction bytes and one or more constants. During operation, the instruction decode unit may obtain the one or more instruction bytes associated with an instruction, and the constant steer network may obtain the corresponding constant(s) embedded within the instruction, from the instruction buffer. The processing unit may deallocate space within the instruction buffer associated with the instruction after the constant steer network acquires the constant(s) embedded within the instruction from the instruction buffer.

In some embodiments, each of the constant steer networks may include a constant steer unit and a constant buffer. The constant steer unit may obtain the one or more constants embedded in the corresponding instruction based on location information received from the instruction decode unit, and store the constant(s) in the constant buffer. In one embodiment, a pair of constant steer networks may be joined together to acquire a constant that is greater than a predetermined size.

Figure 1:
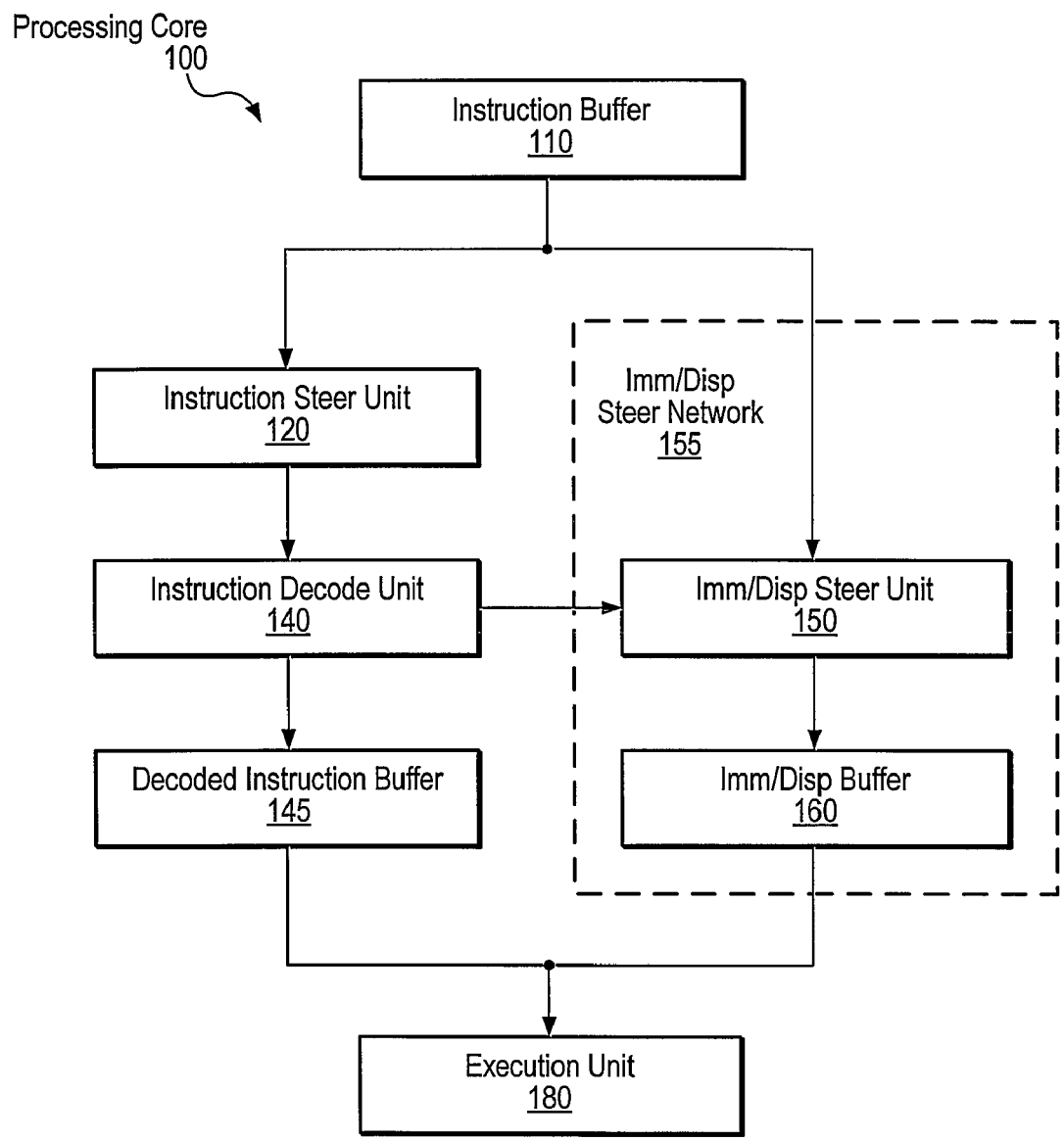
FIG. 1 is a block diagram of one embodiment of an exemplary front end of a processor core.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Turning now to FIG. 1, a block diagram of one embodiment of an exemplary front end of a processor core 100 is shown. As illustrated, the processor core 100 may include an instruction buffer 110, an instruction steer unit 120, an instruction decode unit (DEC) 140, a decoded instruction buffer 145, an immediate/displacement (imm/disp) steer network 155, and an execution unit 180. In one embodiment, the imm/disp steer network 155 may include an imm/disp steer unit 150 and an imm/disp buffer 160.

Figure 5:
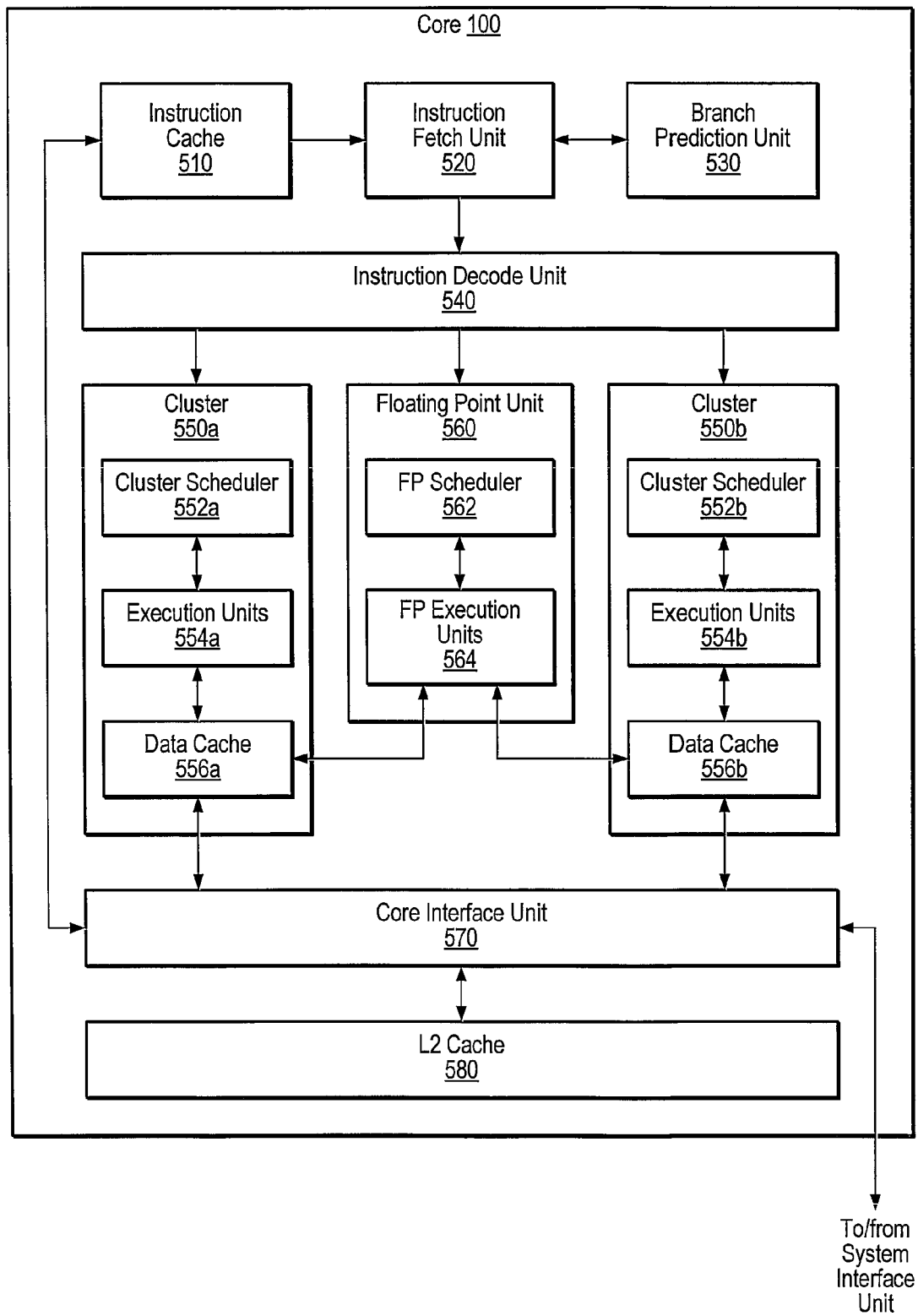
FIG. 5 is a block diagram of one embodiment of a processor core.

Instruction buffer 110 may store instructions which are scheduled to be decoded by DEC 140. In one embodiment, the instructions may be provided to the instruction buffer 110 by an instruction fetch unit, which fetches instructions from an instruction cache, such as an L1 cache, located within processor core 100, e.g., as illustrated in FIG. 5. Instruction steer unit 120 may access instruction buffer 110 to obtain instructions and provide the instructions to DEC 140. DEC 140 may decode the instructions and store the decoded instructions in decoded instruction buffer 145.

The imm/disp steer unit 150 of steer network 155 may obtain constants (e.g., immediate/displacement constants) embedded within the acquired instructions from instruction buffer 110, as will be further described below with reference to FIGS. 2-4. The imm/disp steer unit 150 may store the acquired constants in the imm/disp buffer 160 of steer network 155. Decoded instruction buffer 145 and imm/disp buffer 160 may dispatch the decoded instructions and the corresponding constants, respectively, to execution unit 180 to execute the instructions.

In various embodiments, processing core 100 may be comprised in any of various types of computing or processing systems, e.g., a workstation, a personal computer (PC), a server blade, a portable computing device, a game console, a system-on-a-chip (SoC), a television system, an audio system, among others. For instance, in one embodiment, processing core 100 may be included within a processing unit that is connected to a circuit board or motherboard of a computing system. In some embodiments, processor core 100 may be one of multiple processor cores included within a processing unit of a computing system, as will be further described below with reference to FIG. 6.

It should be noted that the components described with reference to FIG. 1 are meant to be exemplary only, and are not intended to limit the invention to any specific set of components or configurations. For example, in various embodiments, one or more of the components described may be omitted, combined, modified, or additional components included, as desired. For instance, in some embodiments, processor core 100 may include two or more imm/disp steer networks 155, e.g., as shown in FIG. 3.

Figure 2:
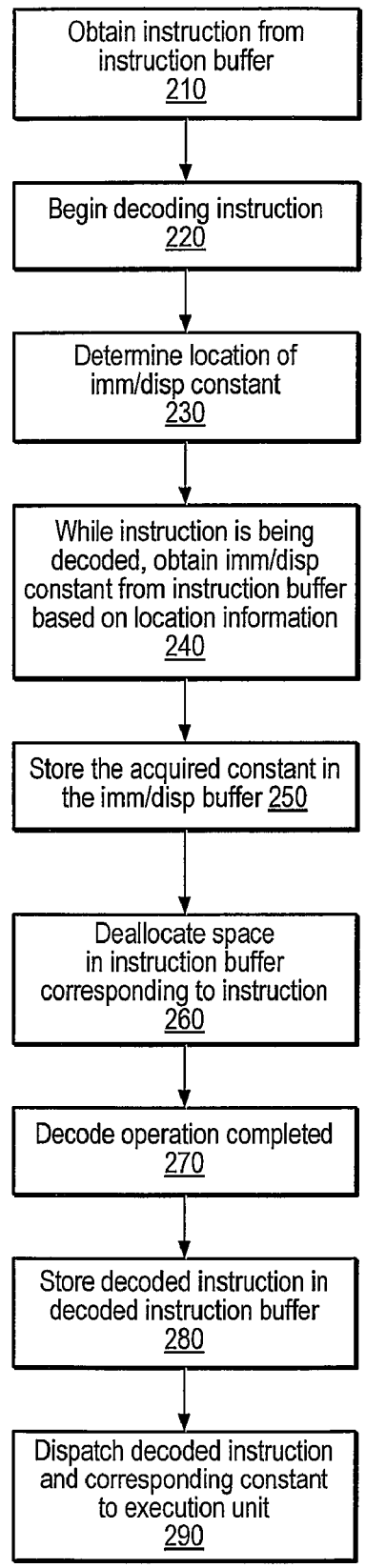
FIG. 2 is a flow diagram illustrating a method for steering and decoding instructions and the corresponding constants, according to one embodiment.

FIG. 2 is a flow diagram illustrating a method for extracting and decoding instructions and the corresponding constants, according to one embodiment. It should be noted that in various embodiments, some of the steps shown may be performed concurrently, in a different order than shown, or omitted. Additional steps may also be performed as desired.

Referring collectively to FIG. 2 and FIG. 1, instruction buffer 110 may store a plurality of instructions that are scheduled to be decoded by DEC 140. Each instruction may include the actual instruction bytes and a constant, e.g., an immediate or displacement (imm/disp) constant. During operation, DEC 140 may obtain at least one instruction from instruction buffer 110 (block 210). In various implementations, DEC 140 may obtain the actual instruction bytes from instruction buffer 110 for the decode operation (e.g., using a multiplexer) and ignore the bits associated with the imm/disp constant. DEC 140 may then begin decoding the instruction (block 220).

Furthermore, DEC 140 may determine the location of the imm/disp constant embedded within the instruction (block 230). For example, DEC 140 may determine the address within instruction buffer 110 where the constant is stored, or if a multiplexer is used to read the instruction bits, which bits of the multiplexer correspond to the bits of the constant. DEC 140 may then provide the location information to the imm/disp steer network 155.

In some implementations, in addition to determining the location information, DEC 140 may determine the size of the constant and provide the size information to imm/disp steer network 155 along with the location information. For instance, DEC 140 may determine that the constant is a 64-bit imm/disp constant or a 32-bit imm/disp, among others. It is noted, however, that some instructions may have more than one constant, or may have no constants. Therefore, in various implementations, DEC 140 may be configured to determine how many constants the instruction has, the size of the constants, and the location of the constants, and provide that information to imm/disp steer network 155.

While the acquired instruction is being decoded by DEC 140, the imm/disp steer unit 150 of steer network 155 may obtain the imm/disp constant embedded within the instruction from instruction buffer 110 based at least on the location information determined by DEC 140 (block 240). In some embodiments, the imm/disp steer unit 150 may also receive size information about the constant from DEC 140, and therefore may use this size information along with the location information to obtain the constant. In one specific implementation, the imm/disp steer unit 150 may acquire the constant by multiplexing out the constant from instruction buffer 110. The imm/disp steer unit 150 may store the acquired constant in the imm/disp buffer 160 of steer network 155 (block 250).

At this point, since the actual instruction bytes have been acquired by DEC 140 and the corresponding imm/disp constant has been acquired by steer network 155, the copy of the instruction that is still stored within instruction buffer 110 may be overwritten with other instruction data. In other words, the space within instruction buffer 110 that is reserved for the bits of the instruction may be deallocated so it is available to store other pending instructions (block 260). In various implementations, the space within instruction buffer 110 may be deallocated while DEC 140 is still decoding the instruction. In some implementations, the space may be deallocated immediately after the steer network 155 acquires the constant from instruction buffer 110. In some cases, instruction buffer 110 may be deallocated relatively early in the decode process, since the steer network 155 may acquire the constant soon after receiving the location information from DEC 140. For example, if a decode operation takes five clock cycles to complete, instruction buffer 110 may be deallocated after two clock cycles, instead of having to wait until the end of the five clock cycles. Since the space within instruction buffer 110 is deallocated (and possibly reused) relatively quickly compared to typical systems, the size of instruction buffer 110 may be less than the size of the buffer in typical systems. Essentially, this design may decouple the size of the instruction buffer 110 from the time it takes to decode instructions and the handling of the imm/disp constants.

After DEC 140 completes the decode operation (block 270), DEC 140 may store the decoded instruction in decoded instruction buffer 145 (block 280). The decoded instruction is stored in decoded instruction buffer 145, and the corresponding constant is stored in imm/disp buffer 160, until further instructions are received from a control unit, e.g., dispatch control unit illustrated in FIG. 4. In response to receiving a control signal from the control unit, decoded instruction buffer 145 and imm/disp buffer 160 may dispatch the decoded instruction and the corresponding constant, respectively, to execution unit 180 to execute the instruction.

This imm/dis constant extraction and decode technique is useful in various processor architectures, such as architectures where the instruction boundaries are not well defined, and where the imm/disp constants within the instructions are also not well defined, e.g., variable length x86 instructions.

Figure 3:
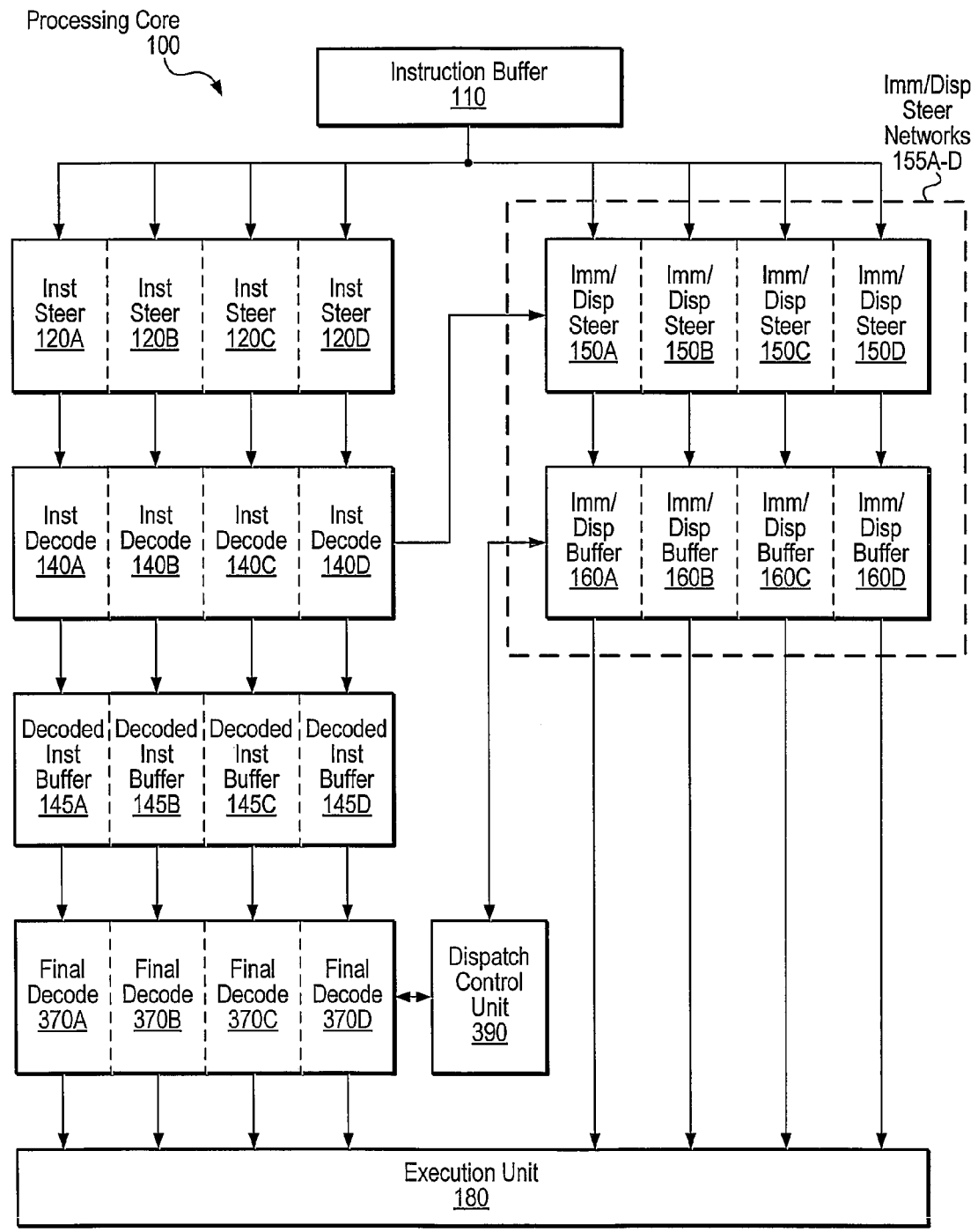
FIG. 3 is a block diagram of another embodiment of an exemplary front end of a processor core.

FIG. 3 is a block diagram of another embodiment of an exemplary front end of processor core 100. As illustrated, the processor core 100 may include instruction buffer 110, instruction steer units 120A-D, instruction decode units (DECs) 140A-D, decoded instruction buffers 145A-D, final decode units 370A-D, a dispatch control unit 390, imm/disp steer networks 155A-D, and execution unit 180. In one embodiment, the imm/disp steer networks 155A-D may include imm/disp steer units 150A-D and imm/disp buffers 160A-D.

In the embodiment illustrated in FIG. 3, processor core 100 includes four of each of the components in both the instruction processing section and the imm/disp processing section. Having multiple of these components may allow processor core 100 to acquire and processes multiple instructions at the same time, along with the corresponding constant(s), for example, using the method described above with reference to FIG. 2. It is noted, however, that in other embodiments processor core 100 may be designed to include two of each of the components, or may be designed to have a variety of other configurations with respect to the number of each of the illustrated components.

In various embodiments, processing core 100 may include one or more final decode units 370, coupled between decoded instruction buffer(s) 145 and execution unit 180. Final decode units 370 may fully decode partially decoded instructions and then dispatch the fully decoded instructions to execution unit 180. Specifically, in these embodiments, each DEC 140 may partially decode an acquired instruction and store the partially decoded instruction in the corresponding decoded instruction buffer 145. When the instruction is ready to be fully decoded for dispatch to execution unit 180, the corresponding final decode unit 370 acquires the partially decoded instruction from decoded instruction buffer 145 and fully decodes the instruction. In some implementations, storing partially decoded instructions may save room within decoded instruction buffer 145 because a partially decoded instruction typically has fewer bits than a fully decoded instruction.

Dispatch control unit 390 may decide which instructions are dispatched to execution unit 180. In the implementations having one or more decoded instruction buffers 145 and one or more final decode units 370 (e.g., FIG. 3), dispatch control unit 390 may instruct decoded instruction buffer 145 and/or the corresponding final decode unit 370 to dispatch the decoded instruction, and may instruction imm/disp buffer 160 to dispatch the imm/disp constant, to execution unit 180. In these implementations, since DEC(s) 140 may partially decode the instructions, DEC(s) 140 may need to decode at least the dispatch information associated with the instruction so that dispatch decisions can be made. In the implementations where DEC(s) 140 fully decodes the instructions and stores them in decoded instruction buffer(s) 145 (e.g., FIG. 1), dispatch control unit 390 may instruct decoded instruction buffer 145 to dispatch the decoded instruction, and may instruction imm/disp buffer 160 to dispatch the imm/disp constant, to execution unit 180. It is noted that in various embodiments dispatch control unit 390 may instruct the components to dispatch the instruction and the corresponding constant to execution unit 180 at approximately the same time.

It should be noted that the components described with reference to FIG. 3 are meant to be exemplary only, and are not intended to limit the invention to any specific set of components or configurations. For example, in various embodiments, one or more of the components described may be omitted, combined, modified, or additional components included, as desired.

Figure 4:
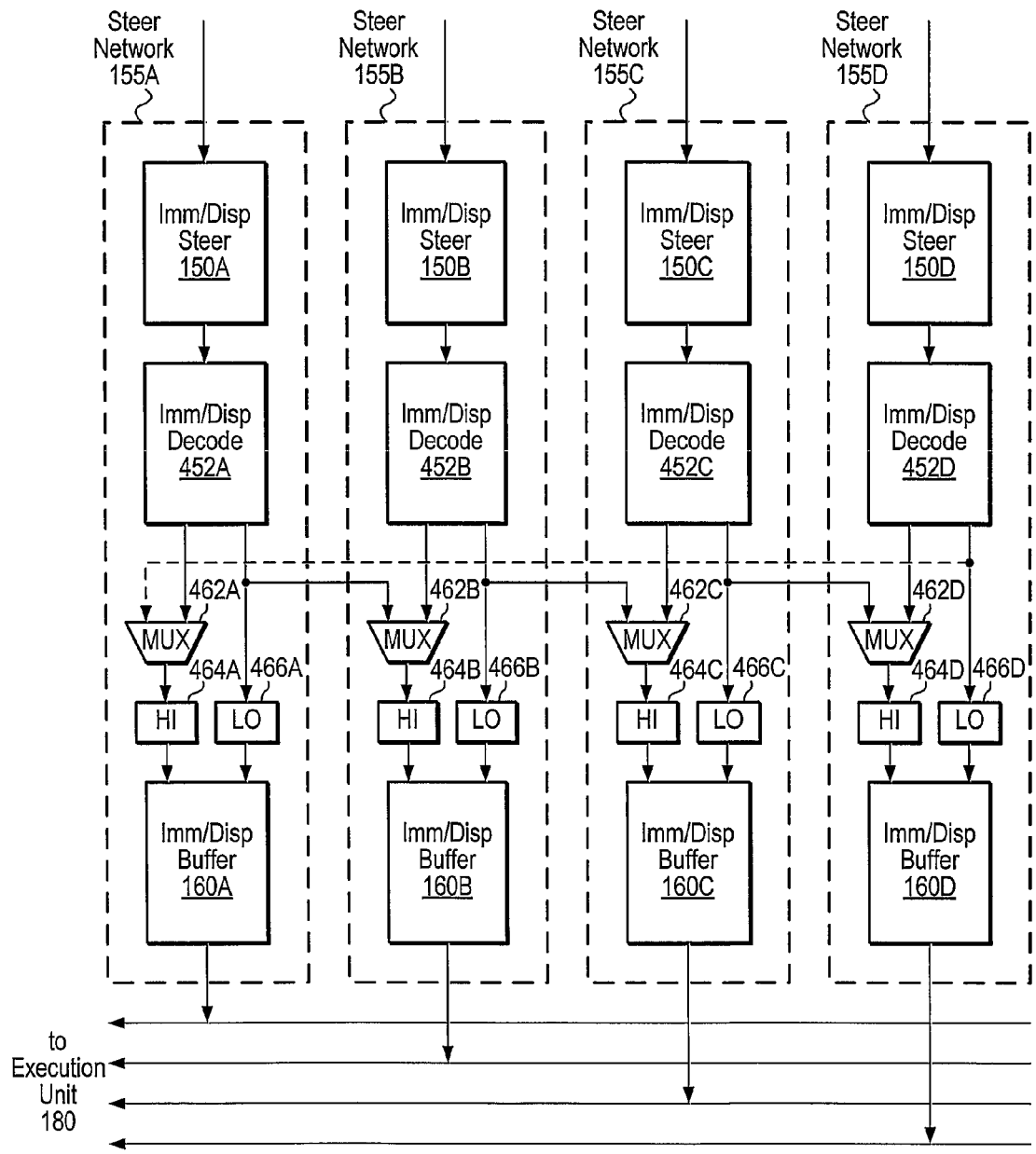
FIG. 4 is a block diagram of one embodiment of a plurality of imm/disp steer networks.

FIG. 4 is a block diagram of one embodiment of a plurality of imm/disp steer networks 155A-D, for example, imm/disp steer networks 155 shown in FIGS. 1 and 3. As illustrated, imm/disp steer networks 155A-D may include imm/disp steer units 150A-D, imm/disp decode units 452A-D, multiplexers 462A-D, 'HI' paths 464A-D, 'LO' paths 466A-D, and imm/disp buffers 160A-D.

In some implementations, e.g., as illustrated in FIG. 4, the imm/disp steer networks 155 may include imm/disp decode units 452, coupled between the imm/disp steer units 150 and the imm/disp buffers 160. Decode units 452 may include logic, e.g., adders, compare logic, etc., to process and decode the imm/disp constants acquired from instruction buffer 110. For instance, in one specific implementation, some constants may need to be processed based on their current address, i.e., their program counter.

Furthermore, in various implementations, pairs of the imm/disp steer networks 155 may be joined together to feed a concatenated imm/disp constant into the corresponding imm/disp buffer 160. As illustrated, the imm/disp steer networks 155 may include multiplexers 462A-D to join the 'LO' path out of one decode unit 452 with the 'HI' path of another decode unit 452. For instance, in the example shown in FIG. 4, the 'LO' path 466A from steer network 155A joins with the 'HI' path 464B of steer network 155B via multiplexer 462B, the 'LO' path 466B from steer network 155B joins with the 'HI' path 464C of steer network 155C via multiplexer 462C, the 'LO' path 466C from steer network 155C joins with the 'HI' path 464D of steer network 155D via multiplexer 462D, and the 'LO' path 466D from steer network 155D joins with the 'HI' path 464A of steer network 155A via multiplexer 462A. It is noted, however, that in other embodiments one or more imm/disp steer networks may be joined in a variety of other configurations.

The mechanism for joining two or more steer networks 155 may reduce the size of the imm/disp steering units 150, and therefore may reduce the die area. In one specific implementation, if the steering networks 155 can acquire up to a 64-bit constant, with this mechanism the imm/disp steering units 150 may be designed to handle up to a 32-bit imm/disp constant, rather than up to a 64-bit constant, and the overall steer network 155 may still function as a 64-bit network. In this implementation, each imm/disp buffer 160 may be configured to store up to a 64-bit imm/disp constant. By using the multiplexers 462, each imm/disp decode unit 452 may be configured to receive up to a 32-bit constant from the steer unit 150 and output up to a 64-bit constant to the imm/disp buffer 160 by joining with another steer network 155. Therefore, in this implementation, even though each of the steer networks 155 may function as a 64-bit network, the imm/disp steer units 150 may each be designed to handle up to 32 bits, which may reduce the size and therefore the cost of the system. It is noted, however, that in other implementations each of the steer networks 155 may function as a 32-bit network and the imm/disp steer units 150 may each be designed to handle up to 16 bits, or the system may have a variety of other configurations with respect to the number of bits the steer networks 155 and steer units 150 can handle.

In one example, if instruction buffer 110 has a pending 64-bit constant, imm/disp steering units 155B and 155C may each acquire half of the 64-bit constant, or 32 bits each, and the decode units 452B and 452C may process the 32 bits. After decode, steer network 155C may be joined with steer network 155B by programming the multiplexer 462C to accept the 32 bits that were processed by steer network 155B and send them to the 'HI' path 464C. The 32 bits that were processed by steer network 155C are sent to the 'LO' path 466C. In other words, the 32 bits that were processed by steer network 155B may be concatenated with the 32 bits that were processed by 155C, and the concatenated 64-bit imm/disp constant is then stored in imm/disp buffer 160.

In various embodiments, the mechanism for joining two steer networks 155 and outputting a concatenated imm/disp constant may be enabled when the acquired constant is larger than any one imm/disp steer unit 150 can handle. In other words, each of the imm/disp steer units 150 may be designed to handle a constant of up to a predetermined size, e.g., up to a 32-bit constant. If a constant of a size greater than the predetermined size is detected, one of the steer networks 155 (or other control circuitry within processing core 100) may use a first steer unit 150 (e.g., 150B) along with a second steer unit 150 (e.g., 150C) to acquire the constant.

In some embodiments, the steer networks 155 may be designed such that the total number of imm/disp buffers 160 match the number of imm/disp buses that connect to execution unit 180. For instance, in the embodiment illustrated in FIG. 4, four imm/disp buffers 160 connect to four separate imm/disp buses, which connect to execution unit 180. Having a matching number of imm/disp buffers 160 and imm/disp buses may prevent the need to multiplex between the buffers. Also, in some implementations, the imm/disp buffers 160 may all be the same width and depth to simplify the design of the steer networks 155. In these embodiments, the constants may be allowed to be dispatched in-order to execution unit 180, as long as the constants are then allowed to be rotated to match up with the corresponding instructions. For example, if the constants arrive at the execution unit 180 in a rotated order with respect to the corresponding instructions, the address lines in the register file where the constants are stored may be rotated to restore the correct order.

It should be noted that the components described with reference to FIG. 4 are meant to be exemplary only, and are not intended to limit the invention to any specific set of components or configurations. For example, in various embodiments, one or more of the components described may be omitted, combined, modified, or additional components included, as desired. For instance, in some embodiments, other mechanisms instead of or in addition to the multiplexers 462 may be used to join two or more steer networks 155 to output concatenated imm/disp constants.

FIG. 5 is a block diagram of one embodiment of processor core 100. Generally speaking, core 100 may be configured to execute instructions that may be stored in a system memory that is directly or indirectly coupled to core 100. Such instructions may be defined according to a particular instruction set architecture (ISA). For example, core 100 may be configured to implement a version of the x86 ISA, although in other embodiments core 100 may implement a different ISA or a combination of ISAs.

In the illustrated embodiment, core 100 may include an instruction cache (IC) 510 coupled to provide instructions to an instruction fetch unit (IFU) 520. IFU 520 may be coupled to a branch prediction unit (BPU) 530 and to an instruction decode unit (DEC) 540. In various embodiments, DEC 540 may be coupled to the components shown in FIGS. 1, 3, and 4. Together with these components, DEC 540 may implement the methods described with reference to FIGS. 1-4 for processing instructions and the corresponding constant(s) embedded within the instructions.

DEC 540 may be coupled to provide operations to a plurality of integer execution clusters 550*a-b* as well as to a floating point unit (FPU) 560. Each of clusters 550*a-b* may include a respective cluster scheduler 552*a-b* coupled to a respective plurality of integer execution units 554*a-b*. Clusters 550*a-b* may also include respective data caches 556*a-b* coupled to provide data to execution units 554*a-b*. In the illustrated embodiment, data caches 556*a-b* may also provide data to floating point execution units 564 of FPU 560, which may be coupled to receive operations from FP scheduler 562. Data caches 556*a-b* and instruction cache 510 may additionally be coupled to core interface unit 570, which may in turn be coupled to a unified L2 cache 580 as well as to a system interface unit (SIU) that is external to core 100 (shown in FIG. 6 and described below). It is noted that although FIG. 5 reflects certain instruction and data flow paths among various units, additional paths or directions for data or instruction flow not specifically shown in FIG. 5 may be provided.

As described in greater detail below, core 100 may be configured for multithreaded execution in which instructions from distinct threads of execution may concurrently execute. In one embodiment, each of clusters 550*a-b* may be dedicated to the execution of instructions corresponding to a respective one of two threads, while FPU 560 and the upstream instruction fetch and decode logic may be shared among threads. In other embodiments, it is contemplated that different numbers of threads may be supported for concurrent execution, and different numbers of clusters 550 and FPUs 560 may be provided.

Instruction cache 510 may be configured to store instructions prior to their being retrieved, decoded and issued for execution. In various embodiments, instruction cache 510 may be configured as a direct-mapped, set-associative or fully-associative cache of a particular size, such as an 8-way, 64 kilobyte (KB) cache, for example. Instruction cache 510 may be physically addressed, virtually addressed or a combination of the two (e.g., virtual index bits and physical tag bits). In some embodiments, instruction cache 510 may also include translation lookaside buffer (TLB) logic configured to cache virtual-to-physical translations for instruction fetch addresses, although TLB and translation logic may be included elsewhere within core 100.

Instruction fetch accesses to instruction cache 510 may be coordinated by IFU 520. For example, IFU 520 may track the current program counter status for various executing threads and may issue fetches to instruction cache 510 in order to retrieve additional instructions for execution. In the case of an instruction cache miss, either instruction cache 510 or IFU 520 may coordinate the retrieval of instruction data from L2 cache 580. In some embodiments, IFU 520 may also coordinate prefetching of instructions from other levels of the memory hierarchy in advance of their expected use in order to mitigate the effects of memory latency. For example, successful instruction prefetching may increase the likelihood of instructions being present in instruction cache 510 when they are needed, thus avoiding the latency effects of cache misses at possibly multiple levels of the memory hierarchy.

Various types of branches (e.g., conditional or unconditional jumps, call/return instructions, etc.) may alter the flow of execution of a particular thread. Branch prediction unit 530 may generally be configured to predict future fetch addresses for use by IFU 520. In some embodiments, BPU 530 may include a branch target buffer (BTB) that may be configured to store a variety of information about possible branches in the instruction stream. For example, the BTB may be configured to store information about the type of a branch (e.g., static, conditional, direct, indirect, etc.), its predicted target address, a predicted way of instruction cache 510 in which the target may reside, or any other suitable branch information. In some embodiments, BPU 530 may include multiple BTBs arranged in a cache-like hierarchical fashion. Additionally, in some embodiments BPU 530 may include one or more different types of predictors (e.g., local, global, or hybrid predictors) configured to predict the outcome of conditional branches. In one embodiment, the execution pipelines of IFU 520 and BPU 530 may be decoupled such that branch prediction may be allowed to "run ahead" of instruction fetch, allowing multiple future fetch addresses to be predicted and queued until IFU 520 is ready to service them. It is contemplated that during multi-threaded operation, the prediction and fetch pipelines may be configured to concurrently operate on different threads.

As a result of fetching, IFU 520 may be configured to produce sequences of instruction bytes, which may also be referred to as fetch packets. For example, a fetch packet may be 32 bytes in length, or another suitable value. In some embodiments, particularly for ISAs that implement variable-length instructions, there may exist variable numbers of valid instructions aligned on arbitrary boundaries within a given fetch packet, and in some instances instructions may span different fetch packets. Generally speaking DEC 540 may be configured to identify instruction boundaries within fetch packets, to decode or otherwise transform instructions into operations suitable for execution by clusters 550 or FPU 560, and to dispatch such operations for execution.

In one embodiment, DEC 540 may be configured to first determine the length of possible instructions within a given window of bytes drawn from one or more fetch packets. For example, for an x86-compatible ISA, DEC 540 may be configured to identify valid sequences of prefix, opcode, "mod/rm" and "SIB" bytes, beginning at each byte position within the given fetch packet. Pick logic within DEC 540 may then be configured to identify, in one embodiment, the boundaries of up to four valid instructions within the window. In one embodiment, multiple fetch packets and multiple groups of instruction pointers identifying instruction boundaries may be queued within DEC 540, allowing the decoding process to be decoupled from fetching such that IFU 520 may on occasion "fetch ahead" of decode.

Instructions may then be steered from fetch packet storage into one of several instruction decoders within DEC 540. In one embodiment, DEC 540 may be configured to dispatch up to four instructions per cycle for execution, and may correspondingly provide four independent instruction decoders, although other configurations are possible and contemplated. In embodiments where core 100 supports microcoded instructions, each instruction decoder may be configured to determine whether a given instruction is microcoded or not, and if so may invoke the operation of a microcode engine to convert the instruction into a sequence of operations. Otherwise, the instruction decoder may convert the instruction into one operation (or possibly several operations, in some embodiments) suitable for execution by clusters 550 or FPU 560. The resulting operations may also be referred to as micro-operations, micro-ops, or uops, and may be stored within one or more queues to await dispatch for execution. In some embodiments, microcode operations and non-microcode (or "fastpath") operations may be stored in separate queues.

Dispatch logic within DEC 540 may be configured to examine the state of queued operations awaiting dispatch in conjunction with the state of execution resources and dispatch rules in order to attempt to assemble dispatch parcels. For example, DEC 540 may take into account the availability of operations queued for dispatch, the number of operations queued and awaiting execution within clusters 550 and/or FPU 560, and any resource constraints that may apply to the operations to be dispatched. In one embodiment, DEC 540 may be configured to dispatch a parcel of up to four operations to one of clusters 550 or FPU 560 during a given execution cycle.

In one embodiment, DEC 540 may be configured to decode and dispatch operations for only one thread during a given execution cycle. However, it is noted that IFU 520 and DEC 540 need not operate on the same thread concurrently. Various types of thread-switching policies are contemplated for use during instruction fetch and decode. For example, IFU 520 and DEC 540 may be configured to select a different thread for processing every N cycles (where N may be as few as 1) in a round-robin fashion. Alternatively, thread switching may be influenced by dynamic conditions such as queue occupancy. For example, if the depth of queued decoded operations for a particular thread within DEC 540 or queued dispatched operations for a particular cluster 550 falls below a threshold value, decode processing may switch to that thread until queued operations for a different thread run short. In some embodiments, core 100 may support multiple different thread-switching policies, any one of which may be selected via software or during manufacturing (e.g., as a fabrication mask option).

Generally speaking, clusters 550 may be configured to implement integer arithmetic and logic operations as well as to perform load/store operations. In one embodiment, each of clusters 550*a-b* may be dedicated to the execution of operations for a respective thread, such that when core 100 is configured to operate in a single-threaded mode, operations may be dispatched to only one of clusters 550. Each cluster 550 may include its own scheduler 552, which may be configured to manage the issuance for execution of operations previously dispatched to the cluster. Each cluster 550 may further include its own copy of the integer physical register file as well as its own completion logic (e.g., a reorder buffer or other structure for managing operation completion and retirement).

Within each cluster 550, execution units 554 may support the concurrent execution of various different types of operations. For example, in one embodiment execution units 554 may support two concurrent load/store address generation (AGU) operations and two concurrent arithmetic/logic (ALU) operations, for a total of four concurrent integer operations per cluster. Execution units 554 may support additional operations such as integer multiply and divide, although in various embodiments, clusters 550 may implement scheduling restrictions on the throughput and concurrency of such additional operations with other ALU/AGU operations. Additionally, each cluster 550 may have its own data cache 556 that, like instruction cache 510, may be implemented using any of a variety of cache organizations. It is noted that data caches 556 may be organized differently from instruction cache 510.

In the illustrated embodiment, unlike clusters 550, FPU 560 may be configured to execute floating-point operations from different threads, and in some instances may do so concurrently. FPU 560 may include FP scheduler 562 that, like cluster schedulers 552, may be configured to receive, queue and issue operations for execution within FP execution units 564. FPU 560 may also include a floating-point physical register file configured to manage floating-point operands. FP execution units 564 may be configured to implement various types of floating point operations, such as add, multiply, divide, and multiply-accumulate, as well as other floating-point, multimedia or other operations that may be defined by the ISA. In various embodiments, FPU 560 may support the concurrent execution of certain different types of floating-point operations, and may also support different degrees of precision (e.g., 64-bit operands, 128-bit operands, etc.). As shown, FPU 560 may not include a data cache but may instead be configured to access the data caches 556 included within clusters 550. In some embodiments, FPU 560 may be configured to execute floating-point load and store instructions, while in other embodiments, clusters 550 may execute these instructions on behalf of FPU 560.

Instruction cache 510 and data caches 556 may be configured to access L2 cache 580 via core interface unit 570. In one embodiment, CIU 570 may provide a general interface between core 100 and other cores 101 within a system, as well as to external system memory, peripherals, etc. L2 cache 580, in one embodiment, may be configured as a unified cache using any suitable cache organization. Typically, L2 cache 580 will be substantially larger in capacity than the first-level instruction and data caches.

In some embodiments, core 100 may support out of order execution of operations, including load and store operations. That is, the order of execution of operations within clusters 550 and FPU 560 may differ from the original program order of the instructions to which the operations correspond. Such relaxed execution ordering may facilitate more efficient scheduling of execution resources, which may improve overall execution performance.

Additionally, core 100 may implement a variety of control and data speculation techniques. As described above, core 100 may implement various branch prediction and speculative prefetch techniques in order to attempt to predict the direction in which the flow of execution control of a thread will proceed. Such control speculation techniques may generally attempt to provide a consistent flow of instructions before it is known with certainty whether the instructions will be usable, or whether a misspeculation has occurred (e.g., due to a branch misprediction). If control misspeculation occurs, core 100 may be configured to discard operations and data along the misspeculated path and to redirect execution control to the correct path. For example, in one embodiment clusters 550 may be configured to execute conditional branch instructions and determine whether the branch outcome agrees with the predicted outcome. If not, clusters 550 may be configured to redirect IFU 520 to begin fetching along the correct path.

Separately, core 100 may implement various data speculation techniques that attempt to provide a data value for use in further execution before it is known whether the value is correct. For example, in a set-associative cache, data may be available from multiple ways of the cache before it is known which of the ways, if any, actually hit in the cache. In one embodiment, core 100 may be configured to perform way prediction as a form of data speculation in instruction cache 510, data caches 556 and/or L2 cache 580, in order to attempt to provide cache results before way hit/miss status is known. If incorrect data speculation occurs, operations that depend on misspeculated data may be "replayed" or reissued to execute again. For example, a load operation for which an incorrect way was predicted may be replayed. When executed again, the load operation may either be speculated again based on the results of the earlier misspeculation (e.g., speculated using the correct way, as determined previously) or may be executed without data speculation (e.g., allowed to proceed until way hit/miss checking is complete before producing a result), depending on the embodiment. In various embodiments, core 100 may implement numerous other types of data speculation, such as address prediction, load/store dependency detection based on addresses or address operand patterns, speculative store-to-load result forwarding, data coherence speculation, or other suitable techniques or combinations thereof.

Figure 6:
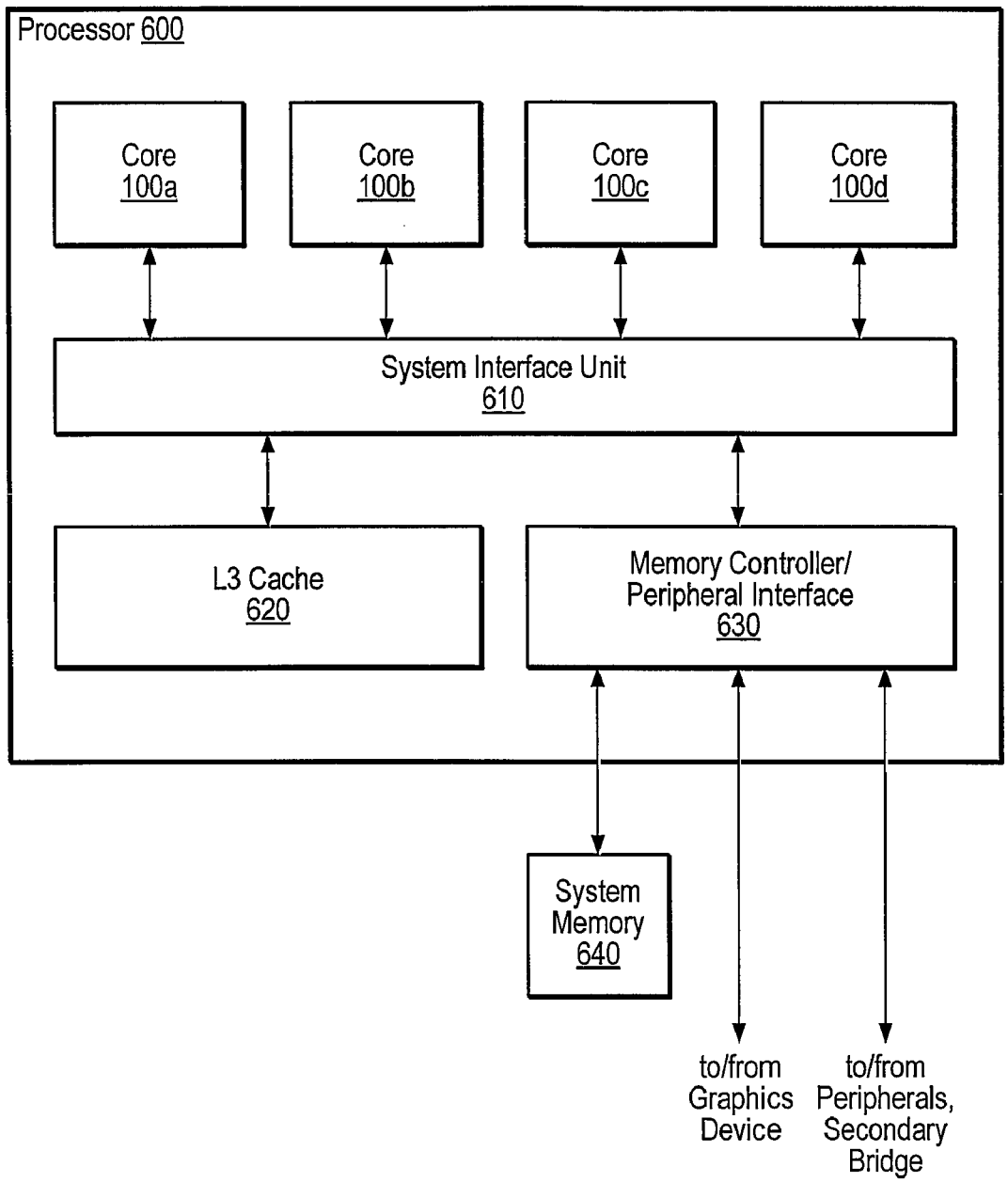
FIG. 6 is a block diagram of one embodiment of a processor including multiple processing cores.

In various embodiments, a processor implementation may include multiple instances of core 100 fabricated as part of a single integrated circuit along with other structures. One such embodiment of a processor is illustrated in FIG. 6. As shown, processor 600 includes four instances of core 100a-d, each of which may be configured as described above. In the illustrated embodiment, each of cores 100 may couple to an L3 cache 620 and a memory controller/peripheral interface unit (MCU) 630 via a system interface unit (SIU) 610. In one embodiment, L3 cache 620 may be configured as a unified cache, implemented using any suitable organization, that operates as an intermediate cache between L2 caches 580 of cores 100 and relatively slow system memory 640.

MCU 630 may be configured to interface processor 600 directly with system memory 640. For example, MCU 630 may be configured to generate the signals necessary to support one or more different types of random access memory (RAM) such as Dual Data Rate Synchronous Dynamic RAM (DDR SDRAM), DDR-2 SDRAM, Fully Buffered Dual Inline Memory Modules (FB-DIMM), or another suitable type of memory that may be used to implement system memory 640. System memory 640 may be configured to store instructions and data that may be operated on by the various cores 100 of processor 600, and the contents of system memory 640 may be cached by various ones of the caches described above.

Additionally, MCU 630 may support other types of interfaces to processor 600. For example, MCU 630 may implement a dedicated graphics processor interface such as a version of the Accelerated/Advanced Graphics Port (AGP) interface, which may be used to interface processor 600 to a graphics-processing subsystem, which may include a separate graphics processor, graphics memory and/or other components. MCU 630 may also be configured to implement one or more types of peripheral interfaces, e.g., a version of the PCI-Express bus standard, through which processor 600 may interface with peripherals such as storage devices, graphics devices, networking devices, etc. In some embodiments, a secondary bus bridge (e.g., a "south bridge") external to processor 600 may be used to couple processor 600 to other peripheral devices via other types of buses or interconnects. It is noted that while memory controller and peripheral interface functions are shown integrated within processor 600 via MCU 630, in other embodiments these functions may be implemented externally to processor 600 via a conventional "north bridge" arrangement. For example, various functions of MCU 630 may be implemented via a separate chipset rather than being integrated within processor 600.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processing unit comprising:
   an instruction decode unit configured to decode instructions which are to be executed by the processing unit, wherein, for each instruction, the instruction decode unit is configured to determine a location of a constant embedded within the instruction; and
   a constant steer network coupled to receive, from the instruction decode unit, location information indicating the location of the constant, the constant steer network including a plurality of constant steer units, wherein each of the constant steer units includes:
   an extraction unit coupled to extract at least a first portion of the constant from the instruction based on the location information;
   a constant decode unit coupled to receive the first portion of the constant from the extraction unit and configured to process the first portion of the constant;
   a selection circuit having a first input coupled to a first output of the constant decode unit and a second input coupled to a second output of a constant decode unit in another one of the plurality of constant steer units, wherein the selection circuit is configured to select one of the first or second outputs; and
   a constant buffer coupled to receive and store the first portion of the constant from the selection circuit if the first input is selected by the selection circuit;
   wherein a first extraction unit of a first constant steer unit is configured to extract a constant of up to a predetermined size from the instruction based on the location information received from the instruction decode unit, wherein, in response to detecting a constant of a size greater than the predetermined size, the processing unit is configured to use a second extraction unit of a second constant steer unit along with the first extraction unit to acquire the constant.

2. The processing unit of claim 1, wherein the constant embedded within the instruction is an immediate or displacement (imm/disp) constant.

3. The processing unit of claim 1, further comprising an instruction buffer configured to store the instructions which are to be decoded by the instruction decode unit, wherein each instruction includes one or more instruction bytes and at least one constant, wherein the instruction decode unit is configured to obtain the one or more instruction bytes associated with the instruction, and the constant steer network is configured to extract the at least one constant from the instruction, from the instruction buffer.

4. The processing unit of claim 3, wherein the processing unit is configured to deallocate space within the instruction buffer associated with the instruction after the constant steer network acquires the at least one constant embedded within the instruction from the instruction buffer.

5. The processing unit of claim 1, further comprising a decoded instruction buffer, wherein, after decoding the instruction, the instruction decode unit is configured to store the decoded instruction in the decoded instruction buffer.

6. The processing unit of claim 5, further comprising a dispatch control unit and an execution unit, wherein the dispatch control unit is configured to instruct the decoded instruction buffer to dispatch the decoded instruction to the execution unit, and the dispatch control unit is further configured to instruct the constant buffer to dispatch the corresponding constant to the execution unit.

7. The processing unit of claim 1, further comprising a decoded instruction buffer and a final decode unit, wherein the instruction decode unit is configured to store partially decoded instructions in the decoded instruction buffer, wherein the final decode unit is configured to obtain the partially decoded instructions and fully decode the instructions.

8. The processing unit of claim 1, wherein, for each instruction, the instruction decode unit is configured to determine the location and size of a constant embedded within the instruction, wherein the constant steer network is configured to receive the location and size information from the instruction decode unit, wherein, while the instruction decode unit decodes the instruction, the constant steer network is configured to extract the constant from the instruction based on the location and size information and store the constant.

9. The processing unit of claim 1, wherein the first extraction unit is configured to acquire a first portion of the constant and the second extraction unit is configured to acquire a remaining portion of the constant, wherein one of the first and second steer units is configured to concatenate the acquired portions to form the constant and store the constant in the a corresponding one of a first or second constant buffer.

10. The processing unit of claim 9, wherein the constant buffer of each of the plurality of constant steer units is configured to store constants of up to twice the predetermined size.

11. A method comprising:
decoding instructions which are to be executed by a processing unit using an instruction decode unit;
for each instruction, determining a location of a constant embedded within the instruction;
providing location information indicating the location of the constant to a constant steer network having a plurality of constant steer units;
while the instruction is being decoded, acquiring at least a first portion of the constant from the instruction based on the location information using an extraction unit of a corresponding one of the plurality of constant steer units;
a constant decode unit of the corresponding one of the plurality of constant steer units receiving the first portion of the constant
processing the first portion of the constant subsequent to said acquiring, said processing performed by the constant decode unit;
receiving the first portion on a first input of a selection circuit of the corresponding one of the plurality of constant steer units, the selection circuit having the first input and a second input;
selecting the first input of the selection circuit; and
receiving the first portion of the constant from the selection circuit and storing the first portion of the constant in a constant buffer of the corresponding one of the plurality of constant steer units network;
wherein the method further comprises a first extraction unit of a first constant steer unit extracting a constant of up to a predetermined size from the instruction based on the location information, and, responsive to detecting a constant of a size greater than the predetermined size, the processing unit using a second extraction unit along with the first extraction unit to acquire the constant.

12. The method of claim 11, wherein the constant embedded within the instruction is an immediate or displacement (imm/disp) constant.

13. The method of claim 11, further comprising:
storing the instructions which are to be executed by the processing unit in an instruction buffer;
obtaining the instruction from the instruction buffer using the instruction decode unit;
acquiring the constant from the instruction from the instruction buffer based on the location information using the constant steer network;
deallocating space within the instruction buffer associated with the instruction after acquiring the constant from the instruction buffer.

14. A system comprising:
a memory unit; and
a processing unit coupled to the memory unit, wherein the processing unit includes:
an instruction buffer configured to store a plurality of instructions;
an instruction decode unit configured to obtain the instructions from the instruction buffer and decode the instructions, wherein, for each instruction, the instruction decode unit is configured to determine a location of a constant embedded within the instruction, wherein the constant is an immediate or displacement (imm/disp) constant; and
a constant steer network including a plurality of constant steer units, wherein the constant steer network configured to receive, from the instruction decode unit, location information indicating the location of the constant embedded within the instruction, wherein each of the constant steer units includes:
an extraction unit coupled to extract at least a first portion of the constant from the instruction based on the location information;
a constant decode unit coupled to receive the first portion of the constant from the extraction unit and configured to process the first portion of the constant;

a selection circuit having a first input coupled to a first output of the constant decode unit and a second input coupled to a second output of a constant decode unit in another one of the plurality of constant steer units, wherein the selection circuit is configured to select one of the first or second outputs; and a constant buffer coupled to receive and store the first portion of the constant from the selection circuit if the first input is selected by the selection circuit;

wherein a first extraction unit of a first constant steer unit is configured to extract a constant of up to a predetermined size from the instruction based on the location information received from the instruction decode unit, wherein, in response to detecting a constant of a size greater than the predetermined size, the processing unit is configured to use a second extraction unit of a second constant steer unit along with the first extraction unit to acquire the constant.

15. The system of claim 14, wherein the processing unit is configured to deallocate space within the instruction buffer associated with the instruction after the constant steer network acquires the imm/disp constant from the instruction buffer.

16. The system of claim 14, wherein the constant steer network configured to extract an imm/disp constant embedded in the corresponding instruction based on location information received from the instruction decode unit, and store the imm/disp constant in one or more constant buffers of the plurality of constant steer units.

17. The system of claim 14, wherein a first extraction unit of a first constant steer unit is configured to extract an imm/disp constant of up to a predetermined size from the instruction based on the location information received from the instruction decode unit, wherein, in response to detecting an imm/disp constant of a size greater than the predetermined size, the constant steer network is configured to use a second extraction unit of a second constant steer unit along with the first constant steer unit to acquire the imm/disp constant.

18. The processing unit of claim 1, wherein, for each of the plurality of constant steer units, the constant buffer is coupled to the constant decode unit by a first path and to the selection circuit by a second path, wherein the constant buffer is coupled to receive the first portion of the constant via the first path and a second portion of the constant via the second path if the second input is selected by the election circuit.

19. The system of claim 14, wherein for each of the plurality of constant steer units, the constant buffer is coupled to the constant decode unit by a first path and to the selection circuit by a second path, wherein the constant buffer is coupled to receive the first portion of the constant via the first path and a second portion of the constant via the second path if the second input is selected by the election circuit.

* * * * *

UNITED STATES PATENT AND TRADEMARK OFFICE
CERTIFICATE OF CORRECTION

PATENT NO. : 7,908,463 B2  Page 1 of 1
APPLICATION NO. : 11/768417
DATED : March 15, 2011
INVENTOR(S) : Sean Lie It is certified that error appears in the above-identified patent and that said Letters Patent is hereby corrected as shown below:

In the Claims:

Claim 16, col. 15, line 27, please change "network configured" to "network is configured".

Signed and Sealed this
Tenth Day of May, 2011

David J. Kappos
*Director of the United States Patent and Trademark Office*